United States Patent

Hoshihara et al.

[11] Patent Number: 5,941,498
[45] Date of Patent: Aug. 24, 1999

[54] ROTATION MECHANISM FOR ROTATABLE SEAT

[75] Inventors: Naoaki Hoshihara, Aichi-ken; Takayuki Ohta, Okazaki; Akira Yamakoshi, Yokosuka; Tsutomu Matsubayashi, Zushi, all of Japan

[73] Assignee: Aisin Seiki Kabushiki Kaisha & Kanto Jidosha Kogyo Kabushiki Kaisha, Japan

[21] Appl. No.: 08/936,512

[22] Filed: Sep. 24, 1997

[30] Foreign Application Priority Data

Sep. 27, 1996 [JP] Japan ................................ 8-275261

[51] Int. Cl.⁶ ....................................................... B60N 2/02
[52] U.S. Cl. ...................... 248/550; 248/425; 296/65.18; 296/68.1; 297/344.22
[58] Field of Search ..................... 248/418, 425, 248/550, 415, 349.1; 296/68.1, 65.06, 65.07, 65.18; 297/344.21, 344.22, 344.23

[56] References Cited

U.S. PATENT DOCUMENTS

| 4,518,139 | 5/1985 | Barfell ............................ 297/344.22 X |
| 4,822,099 | 4/1989 | Negi et al. ........................... 248/425 X |
| 4,844,543 | 7/1989 | Ochiai .................................. 248/425 X |
| 5,161,765 | 11/1992 | Wilson ..................................... 248/425 |
| 5,474,353 | 12/1995 | Koester et al. ................. 297/344.21 X |
| 5,540,482 | 7/1996 | Baret et al. ......................... 297/344.22 |
| 5,568,960 | 10/1996 | Oleson et al. ..................... 297/344.22 |
| 5,584,460 | 12/1996 | Ropp .................................. 248/425 X |
| 5,720,462 | 2/1998 | Broderson ............................... 248/425 |
| 5,810,441 | 9/1998 | Ezuka et al. ................... 297/344.22 X |

FOREIGN PATENT DOCUMENTS

| 61-163034 | 7/1986 | Japan . |
| 61-196833 | 9/1986 | Japan . |
| 63-141841 | 6/1988 | Japan . |

Primary Examiner—Derek J. Berger
Attorney, Agent, or Firm—Finnegan, Henderson, Farabow, Garrett & Dunner, L.L.P.

[57] ABSTRACT

A pin secured at one end of a link is inserted into an L-shaped groove of a lock lever pivoted to the upper surface of an upper guide rail and the other end of the link is connected to an actuator by way of a wire. The hook of the lock lever can be inserted into the hook hole of the flange of the lower guide rail. Rotating of the lock lever and thus rotation of the upper guide rail relative to the lower guide rail by an accidental external force to the lock lever can be prevented in the rotatable seat.

6 Claims, 5 Drawing Sheets

ROTATION MECHANISM FOR ROTATABLE SEAT

BACKGROUND OF THE INVENTION

The present invention relates to a rotation mechanism for a rotatable seat for vehicles for convenience of entry into and exit from a vehicle.

More specifically, the present invention relates to a rotation mechanism for a rotatable seat which allows the seat to be pivotable between a normal forwardly directed position and a pivoted position directed toward a door opening for providing easy entry and exit of passengers into and from the vehicle's seat.

For easy entry and exit of the passengers into and from the vehicle's seat, recently rotatable seats for use on the automotive vehicles have been developed, which are generally provided with a rotation mechanism including a latch member to prevent the seat from being free to be rotated with respect to a vehicle's floor when the seat is in the normally forwardly directed position.

A typical rotation mechanism for a rotatable seat has, as shown in FIG. 5 and FIG. 6, a lower rail 1 secured to a floor of a vehicle, an upper rail 2 slidable forwardly and backwardly relative to the lower rail 1, a lower guide rail 4 secured to the upper rail 2 and having a cylindrical flange 3, an upper guide rail 5 rotatable around the flange 3 and having a lock lever 6 for restricting the rotation of the upper guide rail 5 against the lower guide rail 4, in which construction a seat cushion (not illustrated) is mounted to the upper guide rail 5. In FIG. 6, reference numeral 7 denotes a ball for facilitating relative rotation between both of the guide rails 4 and 5, and 8 denotes a shoe secured to an inverted U-shaped edge at the top end of the flange 3.

Upon use, after detecting the parking or neutral position of a shift lever or confirming the detection of the off position of an ignition key, the upper guide rail 5 is manually rotated relative to the lower guide rail 4 by the operation of the lock lever 6 to turn the seat toward the door opening to facilitate getting in and out of a passenger.

Examples of such the rotation mechanism for rotatable seat are disclosed, for example, in Japanese Patent Laid-Open Publication Sho 63-141841 (1988), Japanese Patent Laid-Open Publications Sho 61-163034 (1986) and Sho 61-196833 (1986). These prior art examples teach that the operation of the lock lever is enabled in accordance with a signal from the shift lever or the ignition key operation, and that the solenoid or the actuator is utilized for the operation control of the lock lever.

However, in the prior art examples described above, when an external force higher than the operation force for a manual operation of the lock lever is exerted on the lock lever, the external force is directedly inputted into the solenoid or the actuator, which may undesirably lead to destruction of the solenoid or the actuator.

SUMMARY OF THE INVENTION

Therefore, it is an object of the present invention to solve the disadvantage of the prior art as described above.

In accordance with the present invention, for overcoming the problems described above, there have been basically used such technical means of interposing a link between a lock lever and an actuator, connecting one end of the link by using a pin and an L-shaped groove, and connecting the link and the actuator by using a wire or like other flexible member.

More specifically, the present invention provides the rotation mechanism for rotatable seat comprising a lower guide rail adapted to be supported on rail means mounted to a vehicle floor, an upper guide rail rotatable relative to the lower guide rail and adapted to secure a seat cushion thereon, a lock lever equipped with a handle and pivoted on the upper guide rail, an actuator supported on the upper guide rail, and a link connected at one end by way of a pin to an L-shaped groove formed on the lock lever and connected at the other end with the actuator, the pin at one end of the link restricting the rotation of the lock lever when a hook at one end of the lock lever engages a hook hole of the lower guide rail, manual rotation of the lock lever being enabled when the actuator rotates the link by electric current supply to the actuator, thereby releasing engagement between the hook of the lock lever and the hook hole of the guide rail to allow the rotation of a seat.

The link interposed between the lock lever and the actuator restricts the rotation of the lock lever in a so-called locked state in which the hook of the lock lever is engaged into the hook hole of the lower guide rail (seat is not rotatable), enables rotation of the lock lever only after the rotation of the link by a predetermined amount by the actuator, thereby enabling to establish an unlocked state of detaching the hook of the lock lever out of the hook hole of the lower guide rail (seat is rotatable).

DETAILED DESCRIPTION OF PREFERRED EMBODIMENT

Figure 4:
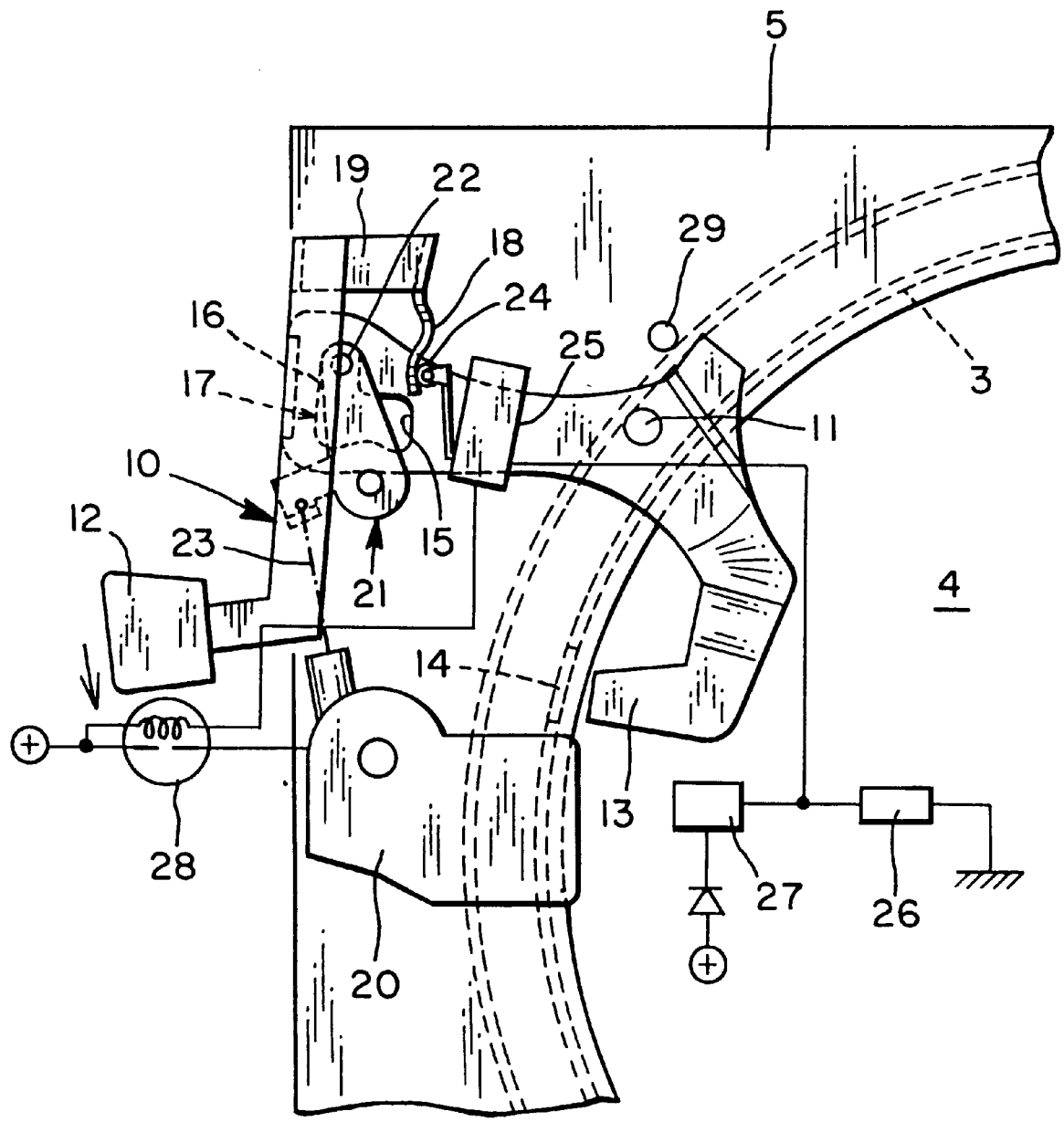
FIG. 4 is a plan view illustrating a state of rotating a lock lever.
Figure 5:
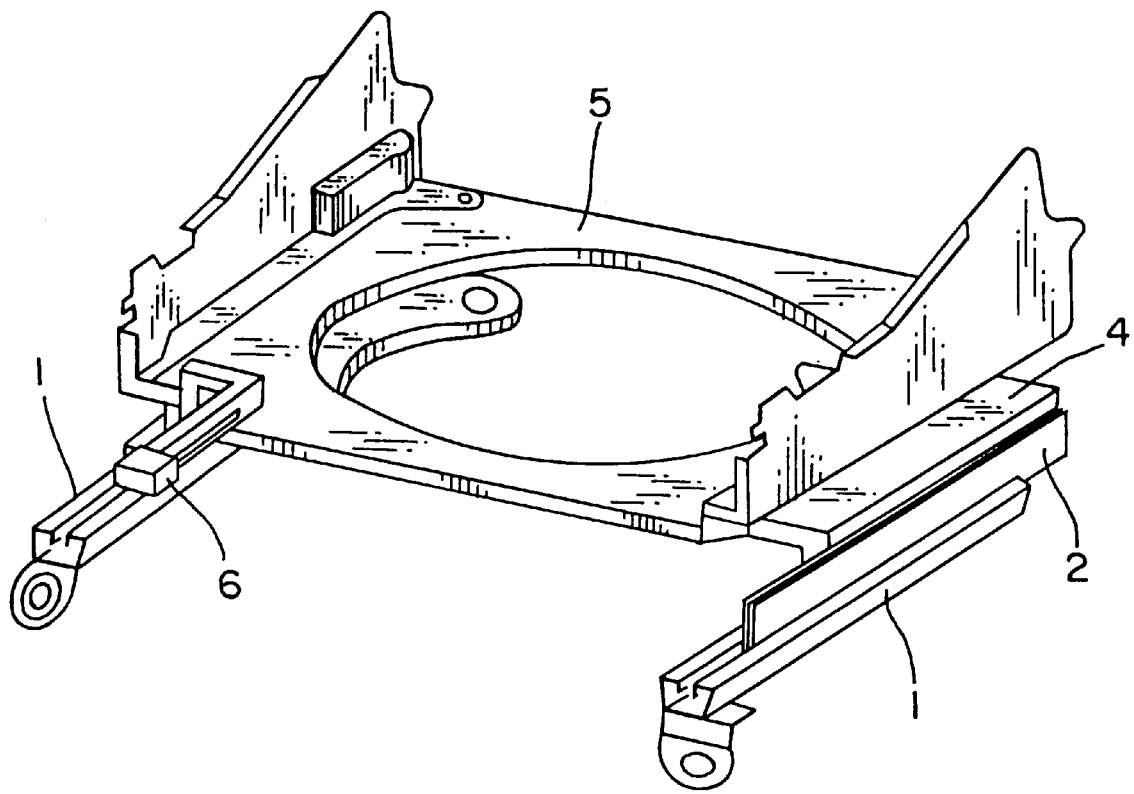
FIG. 5 is perspective view illustrating a typical frame structure of a conventional rotary type seat.
Figure 6:
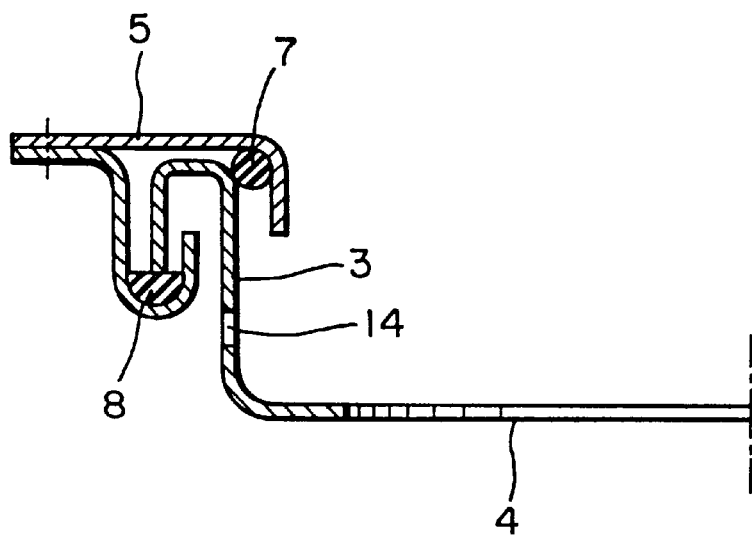
FIG. 6 is a fragmentary cross sectional view illustrating a combination of upper and lower guide rails as used in the conventional rotatable seat in FIG. 5.

Since prior art construction shown in FIG. 5 and FIG. 6 and other known constructions can be used as rail means supported on a vehicle floor and a lower guide rail and an upper guide rail mounted on the rail means for constituting a rotation mechanism for rotatable seat according to the present invention, explanations therefor are omitted here. In FIG. 1 to FIG. 4, parts corresponding to those shown in FIG. 5 and FIG. 6 are indicated by the same reference numerals.

A lock lever 10 is rotatably fixed by using a pin 11 at the upper surface of a front portion of an upper guide rail 5, to which a seat cushion (not shown) is secured. The lock lever 10 has a handle 12 at one end and a hook 13 extending downwardly and forwardly at the other end which is engageable with a hook hole 14 formed on a flange 3 of a lower guide rail 4. The lower guide rail 4 is secured to an upper rail of the rail means. The handle 12 is disposed at a position easy to be operated by a passenger. An L-shaped groove 17 comprising a lateral groove 15 and a longitudinal groove 16 is formed on a front portion of the lock lever 10. Further, a detection plate 19 having a cam face 18 is secured on the lock lever 10.

An actuator 20 is secured at the upper surface of the upper guide rail 5, an L-shaped link 21 is disposed between the lock lever 10 and the actuator 20, and the link 21 is rotatably supported on the upper surface of the upper guide rail 5. Preferably, the link 21 is always biased clockwise (in FIG. 2) by a spring (not shown). One end of the link 21 has a pin 22, which is inserted into the L-shaped groove 17 and the other end of the link 21 is connected by way of a wire 23 to an output shaft of the actuator 20.

A first switch 25 is secured to the upper guide rail 5 such that a contact 24 thereof follows after the cam face 18 of the detection plate 19. Further, a second switch 27 is disposed, which is situated between lower guide rail 4 and the upper guide rail 5, detects the rotation of the upper guide rail 5 with respect to the lower guide rail 4 and, further, supplies a current to the first switch 25 when a shift of an automatic transmission (A/T) is in a parking range and is connected with a solenoid 26 for locking the A/T shift when the upper guide rail 5 is in the rotation state. The second switch 27 is connected with a power source, while the actuator 20 is connected by way of a relay 28 to the power source.

Figure 2:
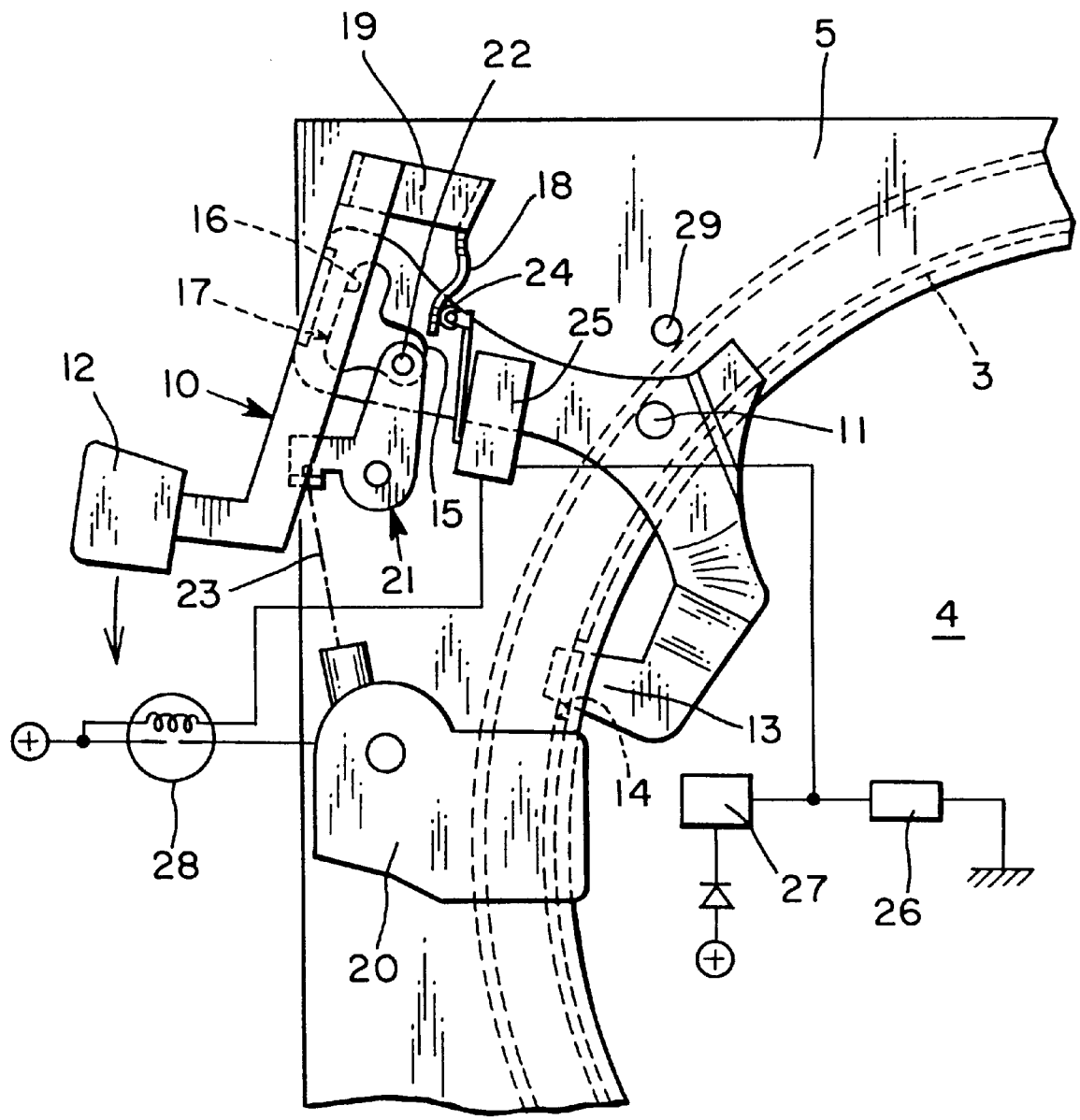
FIG. 2 a plan view illustrating a locked state in which a hook is inserted into a hook hole and a front portion of an upper guide rail.
Figure 3:
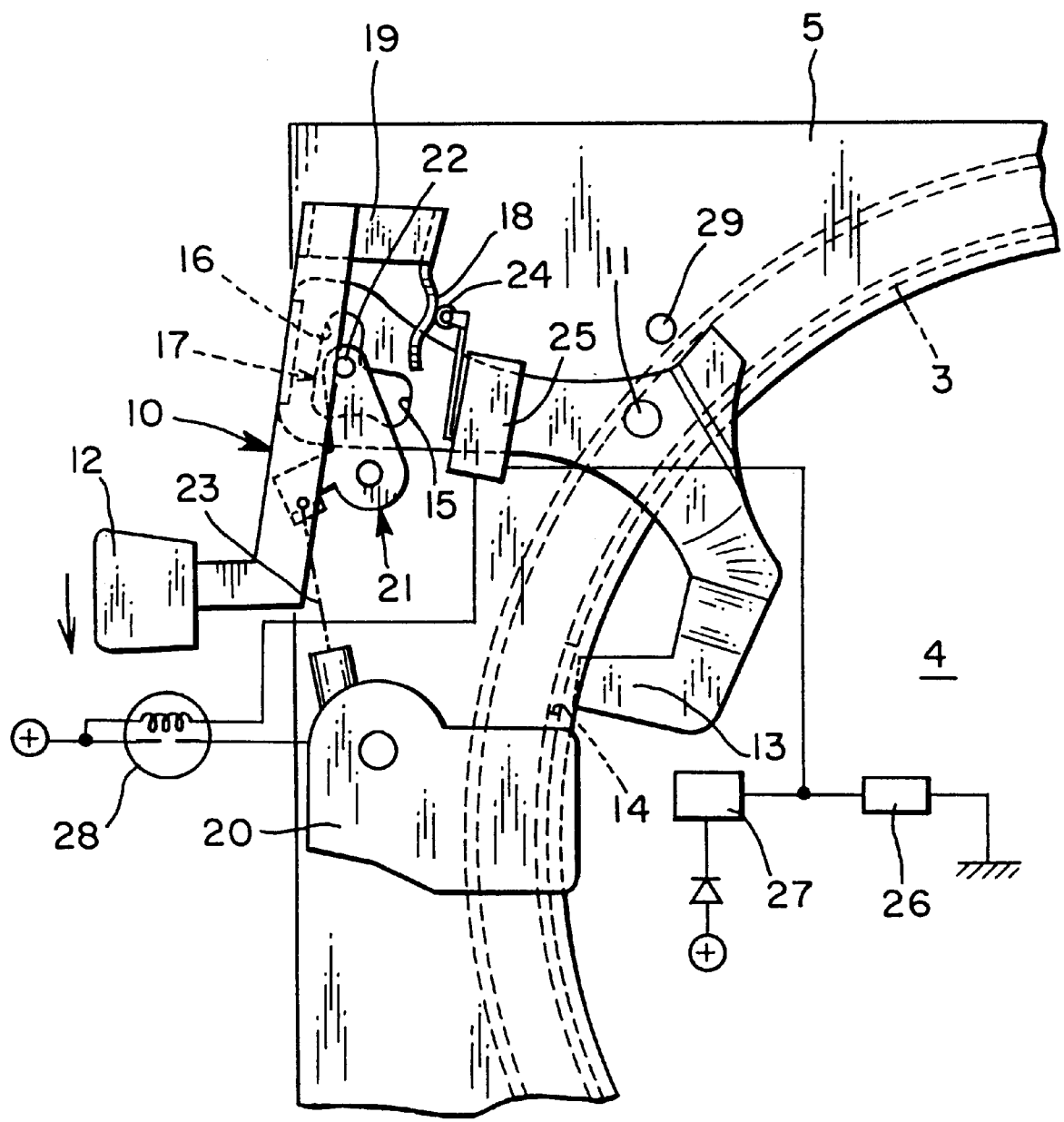
FIG. 3 is a plan view illustrating a state wherein the locked stated is released.

FIG. 2 shows a locked state in which the upper guide rail 5 is secured to the lower guide rail 4 and the seat is directed forward. In this state, when the A/T shift is entered into the parking range, the second switch 27 detects the parking range and supplies a current to the first switch 25. When a passenger rotates the handle 12 of the lock lever 10 counterclockwise (see an arrow in FIG. 2), the cam face 18 of the detection plate 19 pushes the contact 24 of the first switch 25 to turn ON thereby supplying electric current to the actuator 20 and operate the actuator 20.

The actuator 20 thus operated pulls a wire 23, to rotate the pin 22 situated at this time at the right end of the lateral groove 15 of the L-shaped groove 17 and restricting the counterclockwise rotation of the lock lever 10 pin 22 rotates counterclockwise together with the link 21 as viewed in FIG. 2. Thus, the pin 22 moves leftwardly along the lateral groove 15 and then enters into the longitudinal groove 16. Then, the contact 24 turns off the first switch 25 by the cam face 18. Since the pin 22 enters in the longitudinal groove 16, the handle 12 rotates in the direction of the arrow, and takes a state as shown in FIG. 4 by way shown in the state of FIG. 3. The hook 13 detaches from the hook hole 14 and the upper guide rail 5 is made rotatable relative to the lower guide rail 4.

Rotation of the upper guide rail 5 relative to the lower guide rail 4 is detected by the second switch 27, and the A/T shift is locked to the parking range by the solenoid 26 to prevent erroneous starting of the vehicle. Reference numeral 29 denotes a stopper for restricting the rotation of the lock lever 10.

When the seat is rotated and the upper guide rail is returned again into the state shown in FIG. 4, the second switch 27 detects that the seat is facing forward and releases the A/T shift lock. When the handle 12 of the lock lever 10 is turned in the direction opposite to the arrow (clockwise in the drawing), the pin 22 moves from the top end to the base of the longitudinal groove 16 and enters into the lateral groove 15. In this case, the lever 21 rotates clockwise by the resilient force of the spring (not shown) and displaces the pin 22 to the position shown in FIG. 2. In the course of the series of the movement, the cam face 18 pushes the contact 24 thereby turning the first switch 25 to ON, but the turning ON of the first switch 25 in the returning stroke does not operate the actuator 20.

In this way, a state in which the hook 13 is inserted into the hook hole 14 and the rotation of the upper guide rail 5 to the lower guide rail 4 is restricted as shown in FIG. 2 is again attained.

Figure 1:
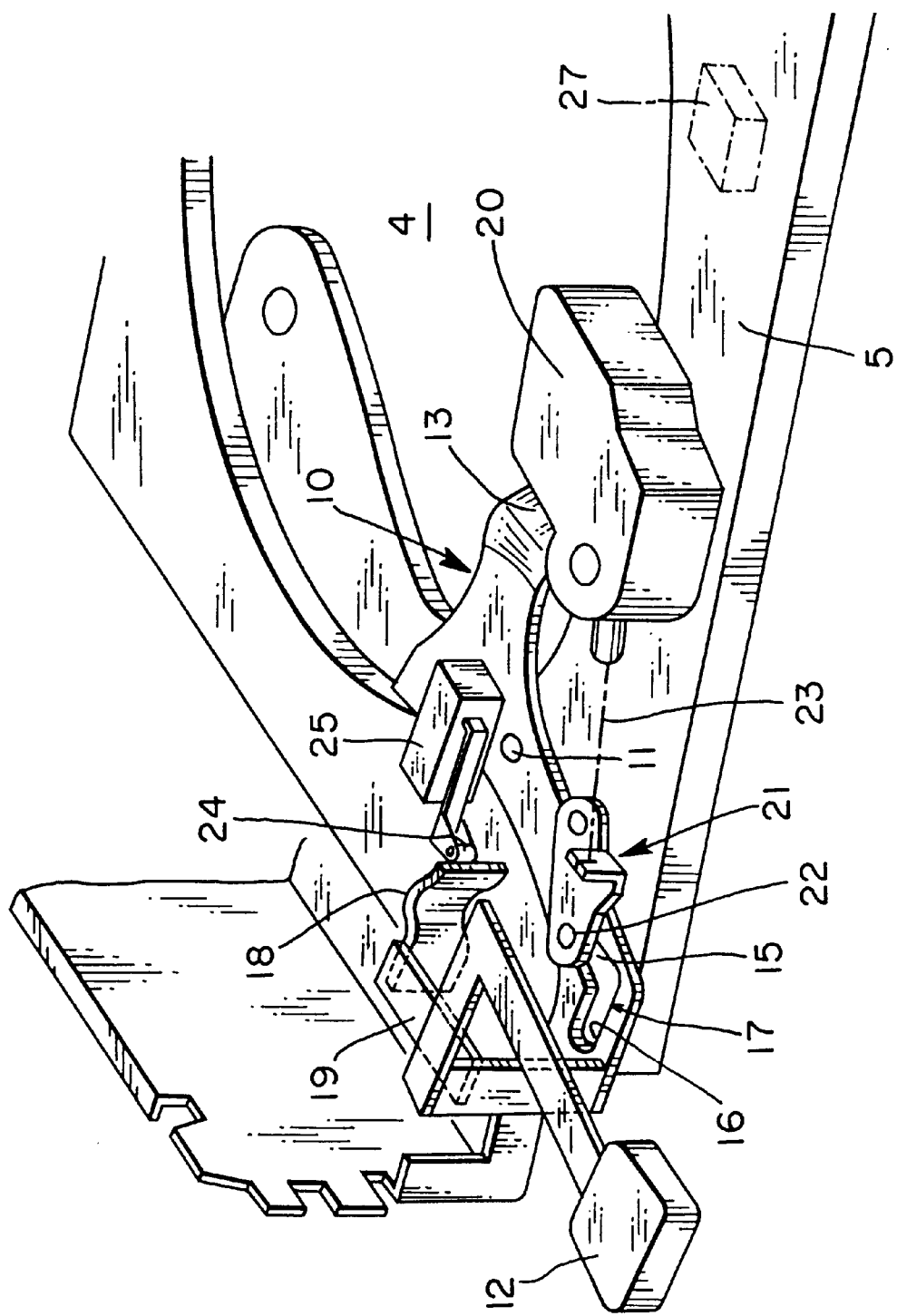
FIG. 1 is a perspective view for one embodiment of the present invention.

In the locked state shown in FIG. 1, since the link 21 is energized clockwise and situated at the end of the lateral groove 15, if the lock lever 10 is intended to be rotated manually, this is resisted by the link 21 and the lock lever 10 can not be rotated.

In the illustrated embodiment, one hook hole 14 is provided on the lower guide rail 4. However, a plurality of the hook holes 14 can be formed on the lower guide rail 4 when selective orienting adjustment of the rotatable seat in the vehicle is desired.

As many apparently widely different embodiments of the present invention can be made without departing from the sprit and scope thereof, it is to be understood that the invention is not limited to the specific embodiments thereof except as defined in the appended claims.

What is claimed is:

1. A rotation mechanism for a rotatable seat comprising a lower guide rail adapted to be supported on rail means mounted to a vehicle floor, an upper guide rail rotatable relative to the lower guide rail and adapted to secure a seat cushion thereon, a lock lever equipped with a handle and pivoted on the upper guide rail, an actuator supported on the upper guide rail, and a link engagably connected at one end to the lock lever and connected at another end with the actuator so as to restrict the rotation of the lock lever by engagement thereof when a hook at one end of the lock lever engages a hook hole of the lower guide rail, manual rotation of the lock lever being enabled when the actuator rotates the link by an electric current supplied to the actuator, thereby releasing engagement between the hook of the lock lever and the hook hole of the lower guide rail to allow the rotation of the seat.

2. A rotation mechanism for a rotatable seat as defined in claim 1, further comprising an electric circuit adapted to being responsive to an automatic transmission shift mechanism of a vehicle being in the park position for enabling electric current supply to the actuator when lock lever is operated rotationally.

3. A rotation mechanism for a rotatable seat as defined in claim 1, wherein the link and the actuator are connected by way of a wire, and including an electric circuit that comprises a first switch adapted to being turned ON when an automatic transmission shift mechanism is in the parking range and depending on the operation angle of the lock lever, a solenoid adapted to release the locking of the automatic transmission shift mechanism upon engagement of the hook of the lock lever and the hook hole of the lower guide rail, and a second switch, connected electrically with the solenoid, for detecting the angle of the rotation of the upper guide rail and supplying current to the first switch.

4. A rotation mechanism for a rotatable seat as defined in claim 3, wherein the first switch conducts ON/OFF control by a cam face of a detection plate secured to the lock lever.

5. A rotation mechanism for a rotatable seat as defined in claim 4, wherein the upper guide rail has a stopper to define a rotational stroke of the lock lever.

6. A rotation mechanism for a rotatable seat as defined in claim 1, wherein the lock lever includes an L-shaped groove and the link includes a pin, the link being connected at the one end to the lock lever by insertion of the pin in the L-shaped groove.

* * * * *